(12) United States Patent
Grzesiak et al.

(10) Patent No.: US 9,200,404 B2
(45) Date of Patent: Dec. 1, 2015

(54) AQUEOUS LEATHER COATING COMPOSITION AND METHOD FOR COATING LEATHER

(71) Applicants: Dow Global Technologies LLC, Midland, MI (US); Rohm and Haas Company, Philadelphia, PA (US)

(72) Inventors: Adam L. Grzesiak, Midland, MI (US); Joseph M. Hoefler, Bensalem, PA (US); Debkumar Bhattacharjee, Blue Bell, PA (US); Bradley K. Hageman, Pottstown, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/064,296

(22) Filed: Oct. 28, 2013

(65) Prior Publication Data
US 2014/0162073 A1 Jun. 12, 2014

Related U.S. Application Data

(60) Provisional application No. 61/722,913, filed on Nov. 6, 2012.

(51) Int. Cl.
| | | |
|---|---|---|
| *C09D 175/04* | (2006.01) | |
| *D06N 3/14* | (2006.01) | |
| *C14C 11/00* | (2006.01) | |
| *C08G 18/62* | (2006.01) | |
| *C08G 18/70* | (2006.01) | |
| *C08G 18/79* | (2006.01) | |
| *C08G 18/28* | (2006.01) | |

(52) U.S. Cl.
CPC .............. *D06N 3/147* (2013.01); *C08G 18/283* (2013.01); *C08G 18/6216* (2013.01); *C08G 18/706* (2013.01); *C08G 18/792* (2013.01); *C09D 175/04* (2013.01); *C14C 11/006* (2013.01); *C08G 2105/02* (2013.01); *Y10T 428/31547* (2015.04)

(58) Field of Classification Search
CPC .... C09D 175/04; C14C 11/006; D06N 3/147; C08G 2105/02; Y10T 428/31547
USPC ........... 428/422.8, 423.3; 524/507; 427/389.9
See application file for complete search history.

(56) References Cited

U.S. PATENT DOCUMENTS

| | | |
|---|---|---|
| 4,325,856 A | 4/1982 | Ishikawa et al. |
| 5,087,646 A | 2/1992 | Tork et al. |
| 5,200,489 A | 4/1993 | Jacobs et al. |
| 6,028,158 A | 2/2000 | Slack et al. |
| 6,252,121 B1 | 6/2001 | Argyropoulos et al. |
| 6,284,836 B1 | 9/2001 | Hassel et al. |
| 6,353,051 B1 | 3/2002 | Huang |
| 6,426,414 B1 * | 7/2002 | Laas et al. ............. 544/222 |
| 6,663,227 B2 | 12/2003 | Yamamoto et al. |
| 6,825,268 B2 * | 11/2004 | Maier et al. ............ 524/840 |
| 7,232,500 B2 | 6/2007 | Neuland et al. |
| 7,232,859 B2 | 6/2007 | Argyropoulos et al. |
| 7,718,263 B2 * | 5/2010 | Takada et al. .......... 428/414 |
| 2008/0103263 A1 * | 5/2008 | Erdem et al. .......... 525/410 |
| 2010/0105833 A1 * | 4/2010 | Keller et al. ........... 524/839 |

FOREIGN PATENT DOCUMENTS

| | | | |
|---|---|---|---|
| DE | 4007637 A1 * | 9/1991 | |
| DE | 10144319 A1 | 3/2003 | |
| WO | 9318014 A1 | 9/1993 | |
| WO | 2004/078820 A1 | 9/2004 | |
| WO | 2006029140 A1 | 3/2006 | |
| WO | 2006029141 A1 | 3/2006 | |

OTHER PUBLICATIONS

Allnex;"Liquid Coating Resins";Product Guide, Waterborne and Solventborne Resins, Americas, Brochure;20 pages.
Geo Specialty Chemicals;"DICAP 2020";Safety Data Sheet;Dec. 26, 2013;11pages.

* cited by examiner

*Primary Examiner* — Thao T Tran
(74) *Attorney, Agent, or Firm* — Karl E. Stauss; Cantor Colburn LLP

(57) ABSTRACT

An aqueous leather coating composition having improved storage stability includes 1 to 40 weight percent of an emulsifiable polyisocyanate comprising the reaction product of an isocyanurate and an emulsifier, wherein the average isocyanate functionality of the emulsifiable polyisocyanate is 2 to 4.5; and 60 to 99 weight percent of an aqueous polymer dispersion having a $T_g$ of −70 to 40° C. and selected from a (meth)acrylic polymer dispersion, a polyurethane dispersion, a (meth)acrylic polymer/polyurethane hybrid dispersion and a combination comprising one or more of the foregoing aqueous polymer dispersions, wherein all weight percents are on a dry basis, and based on the total dry amount of the emulsifiable polyisocyanate and the aqueous polymer dispersion. The aqueous polymer dispersion can be free of hydroxyl groups. Also disclosed are a method of coating leather with the composition, and a coated leather article.

21 Claims, No Drawings

AQUEOUS LEATHER COATING COMPOSITION AND METHOD FOR COATING LEATHER

BACKGROUND OF THE INVENTION

The disclosure generally relates to aqueous coating compositions for leather. The finishing of leather imparts to the leather articles their fashion aspect and their suitability for use. Finishing is understood as meaning the application of binders, dyes, pigments, waxes, handle compositions and further auxiliaries, by customary application techniques, such as spraying, printing, pouring, knife-coating, and application with a plush pad, to the tanned hide. Application can be done in one coat but is generally carried out in a plurality of coats, with further process steps, such as intermediate drying, plating, embossing, milling, being customary. After each application of a finish coat, the leathers are generally stacked. This is possible only if the freshly applied finish coat does not stick to the adjacent leather article in the stack after drying. The conditions for drying an aqueous finish coating on leather are limited and cannot far exceed the shrinkage temperature of the leather (about 120° C. for chrome-tanned leather and about 80° C. for organic tanned leather). Also, the drying time must be short. Owing to these limitations, film-forming polymer dispersions which, after drying, provide a non-tacky finish coat having good mechanical strength are used in the finishing of leather with aqueous coating compositions.

Water-emulsifiable hexamethylene diisocyanate-based crosslinkers have traditionally been used in leather finishing applications, but they suffer from a short activated pot-life when blended with an aqueous coating composition prior to application. Additionally, stored activated coating compositions containing hexamethylene diisocyanate-based crosslinkers usually congeal or are no longer of use in a relatively short time of approximately 6 hours. Thus, polyisocyanate-based leather coating compositions with improved storage stability, and one or more of improved mechanical properties, minimal embrittlement, and low fresh tack, are desirable.

BRIEF SUMMARY OF THE INVENTION

The need for a polyisocyanate-based aqueous leather coating composition having improved storage stability is met by a composition comprising 1 to 40 weight percent of an emulsifiable polyisocyanate comprising the reaction product of an isocyanurate of the formula

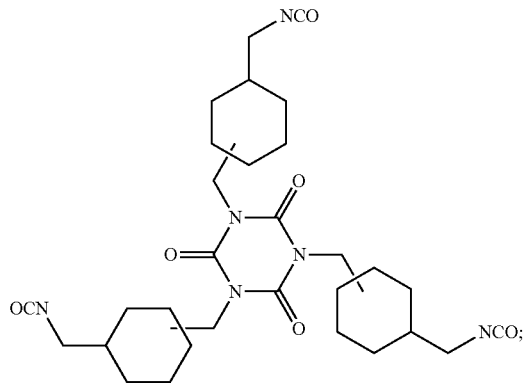

and an emulsifier, wherein the average isocyanate functionality of the emulsifiable polyisocyanate is 2 to 4.5; and 60 to 99 weight percent of an aqueous polymer dispersion having a $T_g$ of −70 to 40° C. and selected from a (meth)acrylic polymer dispersion, a polyurethane dispersion, a (meth)acrylic polymer/polyurethane hybrid dispersion and a combination comprising one or more of the foregoing aqueous polymer dispersions; wherein all weight percents are on a dry basis, and based on the total dry amount of the emulsifiable polyisocyanate and the aqueous polymer dispersion.

Another embodiment is an aqueous leather coating composition 1 to 40 weight percent of the emulsifiable polyisocyanate; 10 to 90 weight percent of the (meth)acrylic polymer dispersion; and 10 to 90 weight percent of the polyurethane dispersion; wherein the emulsifiable polyisocyanate, the (meth)acrylic polymer dispersion, and the polyurethane dispersion are present in a combined amount of 100 weight percent.

Another embodiment is an aqueous leather coating composition comprising: 1 to 40 weight percent of the emulsifiable polyisocyanate 60 to 99 weight percent of an aqueous polymer dispersion having a $T_g$ of −70 to 40° C. and selected from a (meth)acrylic polymer dispersion, a polyurethane dispersion, a (meth)acrylic polymer/polyurethane hybrid dispersion and a combination comprising one or more of the foregoing aqueous polymer dispersions; wherein all weight percents are on a dry basis, and based on the total dry amount of the emulsifiable polyisocyanate and the aqueous polymer dispersion; and wherein the aqueous polymer dispersion is free of hydroxyl groups.

Another embodiment is a method of coating leather, comprising: applying the aqueous leather coating composition to leather; and drying the aqueous leather coating composition to form a coating. Another embodiment is a coated leather article formed by the method of coating leather.

DETAILED DESCRIPTION OF THE INVENTION

Leather coatings based on hexamethylene diisocyanates are subject to a short pot-life, especially when stored as an activated topcoat composition. The Applicants surprisingly discovered that aqueous leather coating compositions based on emulsifiable polyisocyanates derived from an isocyanurate trimer of the formula (1)

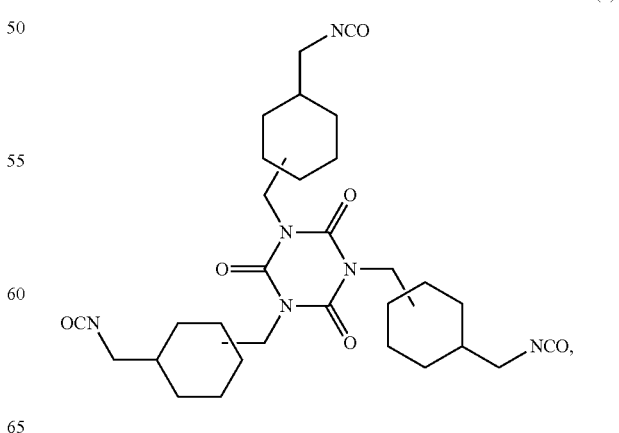

referred to herein as "emulsifiable ADI trimers" (where ADI stands for aliphatic diisocyanate), exhibited a longer pot life than emulsifiable isocyanurates derived from the corresponding hexamethylene diisocyanate trimer, and that the emulsifiable polyisocyanate based on ADI trimer can be used in both basecoats and topcoats.

The Applicants also surprisingly found that not only does the viscosity of the aqueous leather coating composition comprising emulsifiable ADI trimers remain stable for longer periods of time, but upon extended storage, the coating compositions can pass fine filtration without deposition of significant gel, grit, or skin on the filter. Moreover, the aged coating compositions can also be re-dosed with additional emulsifiable ADI trimer. The extended lifetime of the coating composition results in reduced waste. In relation to coating film properties, improved mechanical properties, for example wear resistance, were obtained without a loss of flexibility.

The aqueous leather coating composition, hereafter also referred to as the coating composition, can comprise 1 to 40 weight %, specifically 10 to 40 weight %, even more specifically 20 to 40 weight % of an emulsifiable polyisocyanate comprising the reaction product of the isocyanurate of formula (1) and an emulsifier, wherein the average isocyanate functionality of the emulsifiable polyisocyanate is 2 to 4.5; and 60 to 99 weight %, specifically 60 to 90 weight %, even more specifically 60 to 80 weight % of an aqueous polymer dispersion having a $T_g$ of −70 to 40° C. and selected from a (meth)acrylic polymer dispersion, a polyurethane dispersion, a (meth)acrylic polymer/polyurethane hybrid dispersion and a combination comprising one or more of the foregoing aqueous polymer dispersions, wherein all weight percents are on a dry basis, and based on the total dry amount of the emulsifiable polyisocyanate and the aqueous polymer dispersion.

The isocyanurate of formula (1) can be derived from a diisocyanate of formula (2)

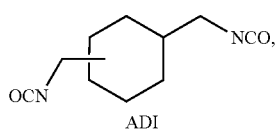

(2)

referred to herein as "aliphatic diisocyanate", or "ADI". Specifically, the isocyanurate of formula (1) can be derived from one or more of cis-1,3-bis(isocyanatomethyl)cyclohexane, trans-1,3-bis(isocyanatomethyl)cyclohexane, cis-1,4-bis(isocyanatomethyl)cyclohexane, and trans-1,4-bis(isocyanatomethyl)cyclohexane.

ADI can be used as an admixture as manufactured from, for example, the Diels-Alder reaction of butadiene and acrylonitrile, subsequent hydroformylation, then reductive amination to form the corresponding diamine, that is, cis-1,3-cyclohexane-bis(aminomethyl), trans-1,3-cyclohexane bis(aminomethyl), cis-1,4-cyclohexane-bis(aminomethyl) and trans-1,4-cyclohexane-bis(aminomethyl), followed by reaction with phosgene to form the cycloaliphatic diisocyanate mixture. The preparation of the cyclohexane-bis(aminomethyl) is described in U.S. Pat. No. 6,252,121, the disclosure of which is incorporated herein by reference.

Optionally, the isocyanate can comprise other multifunctional isocyanates. Illustrative of such isocyanates are 2,4- and 2,6-toluene diisocyanates, 4,4'-biphenylene diisocyanate, 4,4'-diphenylmethane diisocyanate, meta- and para-phenylene diisocyanates, 1,5-naphthylene diisocyanate, 1,6-hexamethylene diisocyanate, bis(2-isocyanato)fumarate, 4,4'-dicyclohexanemethyl diisocyanate, 1,5-tetrahydronaphthylene diisocyanate, isophorone diisocyanate, and the like. The isocyanate can comprise 1,3- and 1,4-bis(isocyanatomethyl)cyclohexane monomers with 1,6-hexamethylene diisocyanate (HDI). The amount of HDI present is as per given for the amounts of other isocyanates as described above. The minor amounts of other multifunctional isocyanates can range from 0.1 to 50% or more, specifically from 0 to 40%, more specifically from 0 to 30%, even more specifically from 0 to 20% or from 0 to 10% by weight of the total polyfunctional isocyanate used in the formulation.

Optionally, the isocyanate can comprise different polyisocyanates that are mixed prior to the trimerization step, or trimers and higher oligomers of the individual isomers can be formed and then blended together. For example, trimers and higher oligomers of the 1,3- and 1,4-isomers of bis(isocyanatomethyl)cyclohexane can be separately produced and the products mixed, or the 1,3- and 1,4-isomers can be present together before the trimerization step. In a similar manner, the isocyanurate polyisocyanates containing multifunctional isocyanates other than bis(isocyanatomethyl)cyclohexane can be produced by having the other multifunctional isocyanates present prior to trimerization or produced separately and blended in with the isocyanurate polyisocyanates produced from the bis(isocyanatomethyl)cyclohexane isomers. Polyisocyanates can be produced from the 1,3- and 1,4-isomers when both isomers are present in the initial reaction mixture. It is also preferred that any other multifunctional isocyanates be present prior to the start of or during the trimerization reaction.

The isocyanate monomer can comprise blocked isocyanate monomers. The blocking agent can comprise one or more of oximes, phenols, caprolactam, imidazoles, and active methylene compounds.

ADI can be cyclized to form an ADI trimer composition comprising an ADI trimer as shown below

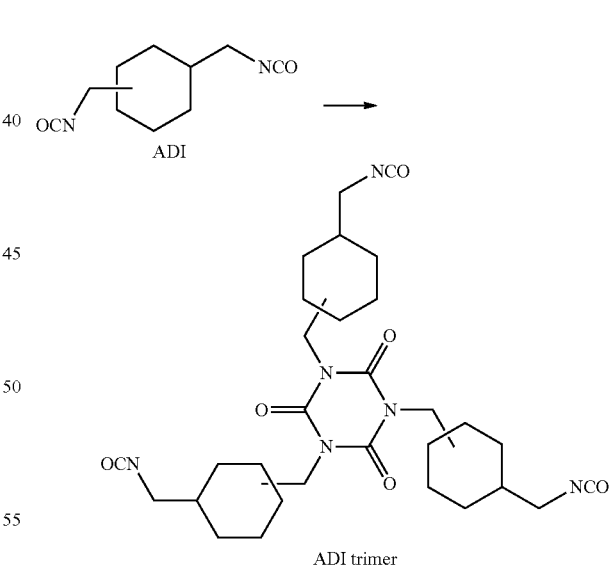

where the ADI trimer as illustrated above is a 3-functional trimer. It is noted that the final ADI trimer composition is not necessarily purely the 3-functional isocyanate, but can be a mixture of isomers where multiple isocyanurate rings can exist, affecting the overall functionality. For example, a typical ADI trimer composition can comprise 48.6% of ADI trimers with 1 isocyanurate as illustrated in the above reaction scheme, 22.9% of ADI trimers with 2 isocyanurates, 12.5% of ADI trimers with 3 isocyanurates, 6.0% of ADI trimers with 4 isocyanurates, and 9.1% of ADI trimers with 3 isocyanurates. An example of an ADI trimer with 2 isocyanurates is illustrated below

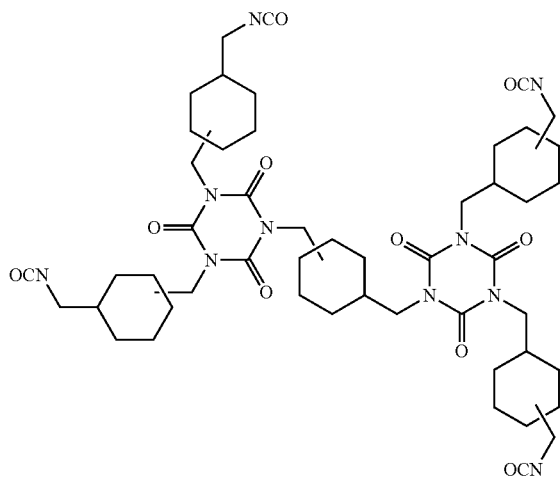

where the above ADI trimer is a 4-functional ADI trimer. As a general class, unless otherwise noted, compounds containing 2 or more isocyanurate rings are referred to as oligomeric timers. The average isocyanate functionality of the ADI trimers can be 2 to 4.5, specifically 3 to 4.5.

The ADI trimers can be prepared in the presence of a trimerization catalyst and optionally in the presence of a solvent and/or a co-catalyst. The ADI trimers can be prepared at a temperature of 30 to 120° C., specifically, 60 to 110° C., optionally in the presence of a trimerization catalyst, advantageously under an atmosphere of gases which are inert under the reaction conditions, for example, nitrogen. The trimerization reaction can be carried out to leave a monomer content of 0 to 80%, specifically 0 to 70%, and more specifically 0 to 65% based on the amount of initial monomer. Generally, at high conversions the amount of monomer remaining in the reaction mixture is 20 to 40% based on the amount of initial monomer.

The final NCO content of the ADI trimer composition (that is, trimer and unreacted monomer) can be 20 to 40 weight %, more specifically 22 to 38 weight % and more specifically 23 to 35 weight %. After the final NCO content is reached, the trimerization catalyst can be deactivated, effectively ending isocyanurate formation. If desired, the excess monomeric diisocyanate can be removed by a process such as distillation with the aid of a thin-film evaporator. If there is unreacted monomer, the NCO content of the ADI trimer composition can be generally 12 to 30 weight % and more specifically 15 to 21 weight % of the polyisocyanate.

Examples of suitable trimerization catalyst are tertiary amines, phosphines, alkoxides, metal oxides, hydroxides, carboxylates and organometallic compounds. Examples of trimerization catalysts which have proven highly successful are tris-(N,N-dialkylaminoalkyl)-s-hexahydrotriazines and organic salts of weak acids containing tetraalkylammonium groups of hydroxyalkylammonium groups, for example, tris-(N,N-dimethylaminopropyl)-s-hexahydrotriazine, trimethyl-N-w-hyroxypropylammonium-2-ethylhexanoate, and N,N-dimethyl-N-hydroxyethyl-N-2-hydroxypropylammonium hexanoate. Due to the their simple preparation and purification, trimerization catalysts can be trialkylhydroxyalkylammonium salts, for example, N,N,N-trimethyl-N-2-hydroxypropylammonium p-tert-butylbenzoate and in particular N,N,N-trimethyl-N-2-hydroxypropylammonium-2-ethylhexanoate. Trimerization catalysts, which can also cause the formation of uretedione groups and oligomeric isocyanurate groups as byproducts, can be used in an amount of 0.001 to 0.5 weight %, specifically 0.005 to 0.1 weight %, based on the weight of the ADI. Alternatively, the ADI trimer can be prepared by trimerization with a heterogeneous trimerization catalyst, see for example, WO 93/18014, the disclosure of which is incorporated herein by reference. The choice of a solid support and of the active groups on the trimerization catalyst can result a varying distribution of the amount the isomers of the ADI trimers.

After the desired amount of ADI trimers have been formed, which can be determined analytically by measurement of the NCO content of the reaction mixture, or by chromatography, the trimerization catalyst can be deactivated. Examples of suitable deactivators are inorganic and organic acids, the corresponding acid-halides and alkylating agents. Specific examples of deactivators include phosphoric acid, monochloroacetic acid, dodecylbenzene/sulfonic acid, benzoyl chloride, dimethyl sulfate, and dibutyl phosphate. The deactivators can be employed in amount 1 to 200 mole %, specifically 20 to 100 mole %, based on the amount of trimerization catalyst. The catalyst can also be deactivated by thermolysis. Typical thermal deactivation temperatures are greater than 130° C. and lower than the decomposition temperatures of the isocyanate, generally less than 200° C.

The ADI trimer can comprise monomeric species, for example, ADI trimers having one isocyanurate moiety, as well as oligomeric species, for example, ADI trimers having two or more isocyanurate moieties. ADI trimers with one isocyanurate can be present in the composition in an amount of 20 to 80 weight %, specifically 25 to 70 weight %, and more specifically 25 to 65 weight % of the composition. ADI trimers with two isocyanurate moieties can be present in the composition in an amount of 5 to 40 weight %. The amount of ADI trimers with one isocyanurate and ADI trimers with two isocyanurate moieties do not need to total 100% as higher oligomers can also be present.

The synthesis of the ADI trimer and/or the modification thereof can be performed in the presence or absence of a solvent. If a solvent is used, it can be chosen such that it is inert toward the respective starting materials. The solvent can be an organic solvent and can comprise, for example, one or more of diethyl ether, tetrahydrofuran, acetone, 2-butanone, methyl isobutyl ketone, ethyl acetate, butyl acetate, benzene, toluene, chlorobenzene, o-dichlorobenzene, xylene, methyoxyethyl acetate, methoxypropyl acetate, ethyl-3-ethoxy propionate, dimethylformamide, dimethylacetamide, or solvent naphtha.

Procedures to modify the isocyanurates of formula (1) to include other functional groups are well known in the art. For example, preparation of allophanate or biuret prepolymers, followed by trimerization is disclosed in U.S. Pat. Nos. 5,663,277 and 6,028,158, the disclosures of which are incorporated herein by reference. In general, the allophanate modified isocyanates are prepared by reacting the isocyanate with an organic compound containing at least one hydroxyl group at a temperature of 50 to 200° C. in the presence of an allophanate-directing catalyst. Furthermore, the addition of a carbodiimide catalyst, such as trialkylphosphate or a phospholene oxide after formation of the timer will allow modifications of the isocyanate to include carbodiimide groups. Carbodiimides can also be formed from the reaction of polyisocyanate monomers in the presence of a carbodiimide catalyst. The carbodiimide groups can react further with a monomeric diisocyanate to form a uretonimine-modified monomeric product. Addition of an acid as a catalyst facilitates further reaction of the uretonimines with monomeric diisocyanate to give a six-membered ring cyclic adduct, for example, imino-s-triazines.

The ADI trimer can be modified with an emulsifier having at least one hydrophilic group and at least one group reactive with isocyanate, selected from hydroxyl, mercapto, or primary or secondary amine. The hydrophilic group can be, for example, an anionic group or a group convertible into an anionic group, a cationic group or a group convertible to a cationic group, or a nonionic polyoxyalkylene group containing sufficient ethylene oxide (EO) repeat units to make the emulsifier hydrophilic.

Anionic groups or groups convertible into anionic groups are, for example, carboxyl and sulfo groups. Thus in some embodiments, the hydrophilic group is a carboxyl or sulfo group. Examples of suitable emulsifiers comprising a carboxyl or sulfo group are one or more of hydroxycarboxylic acids, such as hydroxypivalic acid or dimethylol propionic acid, and hydroxy and aminosulfonic acids such as, amino butanoic acid, amino carproic acid, amino lauric acid, 2-(cyclohexylamino)-ethane-sulfonic acid (CHES), and 3-(cyclohexylamino)-propane-sulfonic acid (CAPS). In order to convert carboxyl or sulfo groups into anionic groups, inorganic and/or organic bases, such as sodium hydroxide, potassium hydroxide, potassium carbonate, sodium bicarbonate, ammonia or primary, secondary or in particular tertiary amines, such as triethylamine or dimethylaminopropanol, can be used.

Cationic groups can be, for example, quaternary ammonium salts. Groups convertible into cationic groups are, for example, tertiary amino groups which are converted into quaternary ammonium salts after neutralization with an organic or inorganic acid. Examples of suitable neutralizing agents are acids, including one or more of hydrochloric acid, acetic acid, fumaric acid, maleic acid, lactic acid, tartaric acid, oxalic acid and phosphoric acid.

The emulsifier can be, for example, a nonionic polymer. In some embodiments, the emulsifier is a polyalkylene oxide or a copolymer of alkylene oxides wherein the alkylene oxides are selected from ethylene oxide, propylene oxide, butylene oxide, and styrene oxide. The emulsifier can be polyethylene oxide or a copolymer of ethylene oxide with propylene oxide, butylene oxide, styrene oxide, or a combination thereof, wherein the copolymer contains sufficient ethylene oxide for the copolymer to be hydrophilic. In some embodiments, the emulsifier is an alkoxy polyethylene oxide of the formula

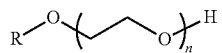

wherein R is a $C_{1-4}$ alkyl group and n is 1 to 100. In some embodiments, R is methyl.

The nonionic polymers can contain at least one polyethylene oxide chain comprising 5 to 100, specifically 10 to 70, and more specifically 15 to 50 ethylene oxide units. The polyalkylene oxide chains present in the polymers can be either polyethylene oxide chains or mixed polyalkylene oxide chains wherein the alkylene oxide units comprise at least 60% of ethylene oxide units. Mixed polyalkylene oxide chains can be block copolymers or random copolymers, and can be prepared by the polyaddition of ethylene oxide, 1,2-propylene oxide or mixtures thereof onto a mono-hydroxyl or di-hydroxyl initiator compound.

The polyalkylene oxide can have between 5 (molecular weight of 220 g/mol) and 100 (molecular weight of 4,400 g/mole) ethylene oxide units, and can comprise blocks of ethylene oxide units. The average molecular weight of the polyalkylene oxide can be 300 to 2,500 g/mole, specifically 500 to 2,000 g/mol.

Monohydroxy- and dihydroxy-functional compounds which can be employed include monohydroxy-functional polyethylene oxides, dihydroxy-functional polyethylene oxides, monohydroxy-functional poly(ethylene oxide-co-propylene oxide)s, and dihydroxy-functional poly(ethylene oxide-co-propylene oxide)s. The monohydroxy-functional polyethylene oxides and poly(ethylene oxide-co-propylene oxide)s can be prepared from initiators selected from methanol, ethanol, propanol, butanol, allyl alcohol, and the like. In some embodiments, the emulsifier is a monohydroxy-functional polyethylene oxide available from Dow under the trade name CARBOWAX, or a monohydroxy-functional poly(ethylene oxide-co-propylene oxide) available from Dow under the trade name UCON.

Dihydroxy-functional polyethylene oxides and dihydroxy-functional poly(ethylene oxide-co-propylene oxide)s can be those available from Dow under the trade names CARBOWAX and UCON. Useful dihydroxy-functional polyethylene oxides have an average molecular weight of 500 to 2,500, specifically 600 to 800 g/mol, and are available from Dow as CARBOWAX PEG. Useful dihydroxy-functional poly(ethylene oxide-co-propylene oxide)s have an average molecular weight of 500 to 5,000, specifically 980 to 2,500, and are available from Dow under the UCON trade name.

The ADI trimer can be modified with methoxy polyethylene glycol (MPEG), a monohydroxy-functional polyethylene oxide, as shown below:

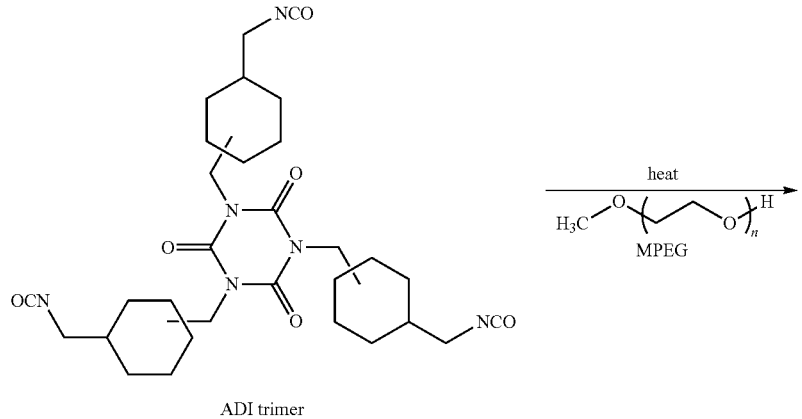

ADI trimer

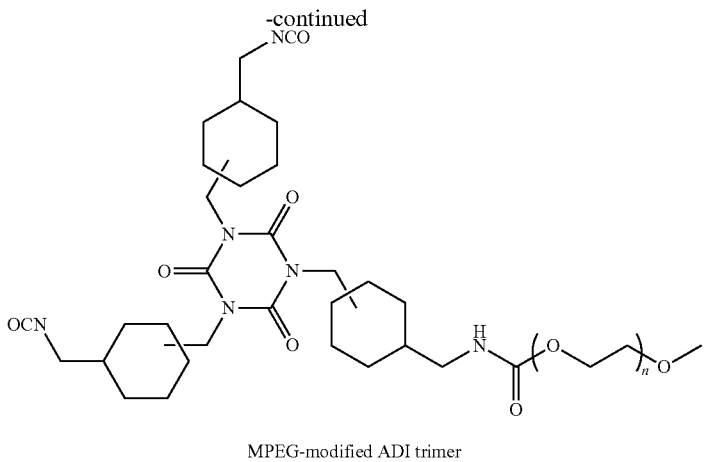

MPEG-modified ADI trimer where n can be 1 to 100, more specifically 5 to 50, even more specifically 7 to 20. The molecular weight of the MPEG can be 70 to 5,000 g/mol, more specifically 300 to 2,500 g/mol, even more specifically 300 to 940 g/mol. MPEG of various molecular weights are available from Dow under the trade name CARBOWAX. CARBOWAX MPEGs are monohydroxy-functional polyoxyethylene oxide polymers that have an all ethylene oxide backbone and an average molecular weight of 100 to 5,000 g/mol. Within this range, the CARBOWAX MPEGs can have an average molecular weight of 300 to 800 g/mol.

The ADI trimer can be modified with a polyethylene oxide or a copolymer of alkylene oxides, wherein the alkylene oxides are selected from ethylene oxide, propylene oxide, butylene oxide, and styrene oxide. The copolymer can contain at least 1 polyethylene chain containing at least 5 ethylene oxide units and the average molecular weight can be 300 to 2,500 g/mol. An example of a copolymer of alkylene oxides is a monohydroxy-functional poly(ethylene oxide-co-propylene oxide) having an average molecular weight of 270 to 3,930 g/mol, available from Dow under the trade name UCON.

The reaction of an ADI trimer with the emulsifier can be done at an isocyanate to isocyanate reactive group (e.g. hydroxyl group) of the emulsifier at a ratio so that the emulsifiable polyisocyanate contains 0.5 to 40 weight %, specifically 1 to 30 weight %, more specifically 2 to 25 weight %, and even more specifically 2 to 21 weight % of the emulsifier.

In the ADI trimer modification, the ADI trimers can be modified in a one-step process or in a multi-step process, for example, in a two-step process where a portion of the ADI trimers is modified and then mixed with the remaining ADI trimer.

The modified ADI trimer can be water-emulsifiable by virtue of hydrophilic, nonionic groups, in particular polyalkylene ether groups. The water emulsifiability can be achieved exclusively by hydrophilic nonionic groups.

The ADI trimer modification can occur with an excess of NCO to isocyanate reactive moiety (such as a hydroxyl group) on the hydrophilic agent. The NCO to hydroxyl equivalent ratio can be 1.05:1 to 20:1. The ADI trimer modification can occur at a temperature of 50 to 130° C., optionally in the presence of a suitable catalyst.

The aqueous leather coating composition can comprise 1 to 40 weight %, specifically 10 to 40 weight %, more specifically 20 to 40 weight % of the emulsifiable polyisocyanate comprising the reaction product of the isocyanurate of formula (1) and the emulsifier.

The coating composition comprises an aqueous polymer dispersion having a glass transition temperature ($T_g$) of −70 to 40° C. and selected from an (meth)acrylic polymer dispersion, a polyurethane dispersion, a (meth)acrylic polymer/polyurethane hybrid dispersion and a combination comprising one or more of the foregoing aqueous polymer dispersions. The aqueous polymer dispersion can comprise polymer particles with a mean diameter of 50 to 500 nanometers (nm), specifically 80 to 350 nm, and more specifically 80 to 200 nm. In some embodiments, the aqueous polymer dispersion does not comprise any groups reactive with isocyanate selected from hydroxyl, mercapto, and primary or secondary amine.

In some embodiments, the aqueous polymer dispersion comprises at least one group reactive with isocyanate selected from hydroxyl, mercapto, and primary or secondary amine. In some embodiments, the at least one group reactive with isocyanate is a hydroxyl group. The aqueous polymer dispersion can be characterized by its hydroxyl number, which is defined as the milligrams of potassium hydroxide equivalent to the hydroxyl content of one gram of the aqueous polymer dispersion on a dry basis, as measured according to ASTM D-1957. In some embodiments, the hydroxyl number is 10 to 500 milligrams per gram (mg/g), specifically 20 to 150 mg/g.

In some embodiments, aqueous polymer dispersion is free of polyhydroxy compounds (polyols). In some embodiments, the aqueous polymer dispersion has a hydroxyl number of less than 10 mg/g, specifically less than 5 mg/g, more specifically less than 1 mg/g. In some embodiments, the aqueous polymer dispersion is free of hydroxyl groups. Thus, the aqueous leather coating composition can comprise 1 to 40 weight percent of an emulsifiable polyisocyanate comprising the reaction product of an isocyanurate of the formula (1) and an emulsifier, wherein the average isocyanate functionality of the emulsifiable polyisocyanate is 2 to 4.5; and 60 to 99 weight percent of an aqueous polymer dispersion having a $T_g$ of −70 to 40° C. and selected from a (meth)acrylic polymer dispersion, a polyurethane dispersion, a (meth)acrylic polymer/polyurethane hybrid dispersion and a combination comprising one or more of the foregoing aqueous polymer dispersions; wherein all weight percents are on a dry basis, and based on the total dry amount of the emulsifiable polyisocyanate and the aqueous polymer dispersion; and wherein the aqueous polymer dispersion is free of hydroxyl groups.

In some embodiments, the aqueous polymer dispersion comprises a (meth)acrylic polymer. The (meth)acrylic polymer can be derived from the polymerization of at least one ethylenically unsaturated monomer such as (meth)acrylates, such as $C_{1-24}$ alkyl(meth)acrylates, hydroxyalkyl(meth)acrylates, and ionic (meth)acrylates such as acid containing (meth)acrylates, amine containing (meth)acrylates, and amide containing (meth)acrylates. $C_{1-24}$ alkyl(meth)acrylates include methyl(meth)acrylate, ethyl(meth)acrylate, butyl (meth)acrylate, 2-ethylhexyl(meth)acrylate, decyl(meth) acrylate, lauryl(meth)acrylate, and stearyl(meth)acrylate. Suitable hydroxyalkyl(meth)acrylates include hydroxyethyl (meth)acrylate and hydroxypropyl(meth)acrylate. Examples of other ethylenically unsaturated monomers are acid-containing monomers include acid-containing (meth)acrylates such as (meth)acrylic acid and (meth)acrylic acid and phosphoethyl(meth)acrylate; and difunctional acids such as citraconic acid, fumaric acid, muconic acid, itaconic acid, maleic acid, as well as anhydrides such as maleic anhydride, which form acids in the presence of water. Other ethylenically unsaturated monomers include styrene; substituted styrenes such as alpha-methyl styrene; vinyl acetate or other vinyl esters; vinyl monomers such as vinyl chloride, vinylidene chloride, N-vinyl pyrrolidone; and (meth)acrylonitrile. Still other ethylenically unsaturated monomers include multiethylenically unsaturated monomers such as allyl(meth)acrylate, diallyl phthalate, 1,4-butylene glycol di(meth)acrylate, 1,2-ethylene glycol di(meth)acrylate, 1,6-hexanediol di(meth)acrylate, and divinyl benzene; and crosslinking monomers such as methylol(meth)acrylamide, acetoacetate monomers, and acetoacetamide monomers. Examples of acetoacetate monomers include vinyl acetoacetate, acetoacetoxyethyl(meth) acrylate, acetoacetoxypropyl(meth)acrylate, allyl acetoacetate, aetoacetoxybutyl(meth)acrylate, and 2,3-diacetoacetoxypropyl(meth)acrylate. Examples of acetoacetamide monomers include vinyl acetoacetamide and acetoacetoxyethyl(meth)acrylamide. The (meth)acrylic polymer can be a copolymer comprising one or more of the foregoing monomers. In some embodiments, the (meth) acrylic polymer is free of copolymerized styrene or substituted styrene, such as alpha-methylstyrene.

The (meth)acrylic polymer can be prepared by aqueous emulsion polymerization processes. In the aqueous emulsion polymerization process, conventional surfactants can be used such as, for example, anionic and/or nonionic emulsifiers such as alkali metal or ammonium alkyl sulfates, alkyl sulfonic acids, fatty acids, and oxyethylated alkyl phenols. The amount of surfactant used can be 0.1 to 6% by weight, based on the weight of monomer. Either thermal or redox initiation processes can be used. The monomer mixture can be added neat or as an emulsion in water. The monomer mixture can be added in one or more additions or continuously over the reaction period allotted. Conventional free radical initiators can be used such as, hydrogen peroxide, t-butyl hydroperoxide, ammonium and/or alkali persulfates, typically at a level of 0.01 to 3% by weight, based on the weight of the total monomer. Redox systems using the same initiators coupled with a suitable reducing agent such as sodium sulfoxylate formaldehyde, sodium hydrosulfite, isoascorbic acid, and sodium bisulfite can be used at similar levels. Chain transfer agents such as mercaptans can be used to lower the molecular weight of the polymer. The weight average molecular weight of the (meth)acrylic polymer can be at least 50,000 g/mol.

The (meth)acrylic polymer can have a glass transition temperature of less than 40° C., specifically −70 to 40° C. The (meth)acrylic polymer can have a weight average molecular weight of 10,000 to 5,000,000 g/mol, specifically 15,000 to 2,000,000 g/mol, as measured by gel permeation chromatography. The (meth)acrylic polymer, in the form of a dried film, can exhibit a tensile strength at break of 0.5 to 10 MPa, a 100% modulus of 0.1 to 1 MPa, and an elongation at break of 500 to 1,800%, as measured according to ASTM D2370-98 (2010), "Standard Test Method for Tensile Properties of Organic Films".

In some embodiments, the aqueous polymer dispersion is selected from a (meth)acrylic polymer dispersion, a styrene-(meth)acrylic polymer dispersion, a styrene-butadiene polymer dispersion, a vinyl acetate polymer dispersion, a vinyl acetate-(meth)acrylic polymer dispersion, an ethylene-vinyl acetate polymer dispersion, an ethylene-vinyl acetate-vinyl chloride polymer dispersion, and a combination thereof. In some embodiments, the aqueous polymer dispersion comprises a (meth)acrylic polymer dispersion.

In some embodiments, the aqueous polymer dispersion comprises a multistage (meth)acrylic polymer dispersion. The multistage (meth)acrylic polymer dispersion can be prepared in a multistage polymerization process in which two or more polymeric stages varying in composition are prepared in sequential fashion. The polymerization techniques used to prepare such aqueous multistage polymer particles are well known in the art, such as U.S. Pat. Nos. 4,325,856, 4,654,397, and 4,814,373. The multistage (meth)acrylic polymers can be prepared by forming a predominantly (meth)acrylic first stage polymer with a glass transition temperature of −70 to 0° C., and specifically −70 to −7° C.; and forming a second stage polymer having a glass transition temperature of at least 20° C., and specifically 20 to 150° C. The weight of the second stage polymer can be in the range of 10 to 25% of the weight of the first stage polymer, based on dry polymer weight. As used herein, "predominantly (meth)acrylic first stage polymer" means that the first stage polymer contains as polymerized units greater than 50 weight % (meth)acrylic monomers, based on the dry weight of the first stage polymer. The first stage polymer can have a glass transition temperature of −70 to −7° C.

Examples of (meth)acrylic polymer dispersions are HYDRHOLAC™ AD-1, HYDRHOLAC™ CL-1, PRIMAL™ ST-89, and PRIMAL™ SB-300 Emulsion, all available from Dow.

In some embodiments, the aqueous polymer dispersion comprises a polyurethane dispersion. Suitable polyurethanes can be prepared by copolymerizing a polyol, for example a polyester, polycarbonate, or polyether diol, with an excess of aliphatic diisocyanate, along with ionic or nonionic dispersing functionality, and optionally branching monomers such as triols. In one process, a polyurethane prepolymer is dispersed in water and chain extended by reaction with diamine to prepare the polyurethane dispersion. In another process, the polyurethane is prepared at a high molecular weight in acetone, dispersed in water, and the acetone is removed to provide the polyurethane dispersion. These and other processes are discussed in P. Pieterich, *Aqueous Emulsion, Dispersion and Solutions of Polyurethanes; Synthesis and Properties* in Progress in Organic Coatings 9 (1981) 281-340. Examples of aliphatic diisocyanates suitable for preparing the polyurethanes include hexamethylene diisocyanate, isophorone diisocyanate, 4,4'-dicyclohexylmethane diisocyanate, and ADI.

The polyol component of the polyurethane can comprise a dihydroxy-functional polyalkylene oxide such as a dihydroxy-functional polyethylene oxide (polyethylene glycol), a dihydroxy-functional polypropylene oxide (polypropylene glycol), a dihydroxy-functional poly(ethylene oxide-co-propylene oxide), or a dihydroxy-functional polybutylene oxide (polybutylene glycol).

The polyol component of the polyurethane can comprise a poly(alkylene alkanedioate)glycol, that can be prepared via a conventional esterification process using a molar excess of a polyalkylene oxide as described above with and an alkanedioic acid. The alkanedioic acid can have 4 to 12 carbon atoms. Examples of suitable alkanedioic acids are maleic acid, malonic acid, succinic acid, glutaric acid, adipic acid, 2-methyl-1,6-hexanic acid, pimelic acid, suberic acid, and dodecanedioic acid. Examples of suitable poly(alkylene alkanedioate)glycols include one or more of poly(hexanediol adipate), poly(butylene glycol adipate), poly(ethylene glycol adipate), poly(diethylene glycol adipate), poly(hexanediol oxalate), and poly(ethylene glycol sebacate).

The polyol component of the polyurethane can comprise a polylactone polyol. Polylactone polyols can be prepared by the reaction of a lactone monomer with an initiator that has active hydrogen-containing groups. Examples of lactone monomers include one or more of δ-valerolactone, ε-caprolactone, and ε-methyl-ε-caprolactone. Examples of initiators that have active hydrogen-containing groups include one or more of ethylene glycol, diethylene glycol, propanediols, 1,4-butanediol, 1,6-hexandiol, and trimethylolpropane.

The polyol component of the polyurethane can comprise a polycarbonate polyol including those obtained from the reaction of diols such as one or more of 1,3-propanediol, 1,4-butanediol, 1,6-hexanediol, diethylene glycol, triethylene glycol, and tetraethylene glycol with diarylcarbonates such as diphenyl carbonate.

The polyurethane dispersion can have a glass transition temperature of less than 40° C., specifically −70 to 40° C. The polyurethane dispersion can have a weight average molecular weight of 10,000 to 2,000,000 g/mol, specifically 15,000 to 1,000,000 g/mol, and more specifically 20,000 to 1,000,000 g/mol, as measured by gel permeation chromatography.

The polyurethane dispersion, in the form of a dried film, can exhibit a tensile strength at break of 1 to 40 MPa, a 100% modulus of 1 to 10 MPa, and an elongation at break of 200 to 1,200%, as measured according to ASTM D2370-98 (2010), "Standard Test Method for Tensile Properties of Organic Films". An example of a suitable polyurethane dispersion is PRIMAL™ Binder U-91, available from Dow.

In some embodiments, the aqueous polymer dispersion comprises a (meth)acrylic polymer/polyurethane hybrid dispersion. The (meth)acrylic polymer/polyurethane hybrid dispersion can have a glass transition temperature of less than 40° C., specifically −70 to 40° C.

In some embodiments, the aqueous leather coating composition comprises both a (meth)acrylic polymer dispersion and a polyurethane dispersion. The coating composition can comprise 10 to 90 weight percent of the (meth)acrylic polymer dispersion and 10 to 90 weight percent of the polyurethane dispersion. Thus in some embodiments, the aqueous leather coating composition comprises 1 to 40 weight percent of the emulsifiable polyisocyanate; 10 to 90 weight percent of the (meth)acrylic polymer dispersion; and 10 to 90 weight percent of the polyurethane dispersion.

When the aqueous polymer dispersion comprises a (meth)acrylic polymer, the (meth)acrylic polymer can contain 0.5 to 10 weight %, specifically 1 to 5 weight %, and more specifically 2 to 3.5 weight % copolymerized carboxylic acid monomers, where carboxylic acid monomers are ethylenically unsaturated monomers that contain at least one carboxylic acid group, and include, for example, (meth)acrylic acid, itaconic acid, maleic acid, as well as anhydrides such as maleic anhydride. Optionally, a (meth)acrylic polymer containing copolymerized carboxylic acid monomer can be combined with a transition metal oxide, transition metal hydroxide, or transition metal carbonate at a pH less than 9, specifically at a pH in the range of 3 to 6, in an amount that is greater than 0.2 equivalent, specifically greater than 0.5 equivalent, of the transition metal per equivalent of the copolymerized carboxylic acid monomers in the polymer particles. The oxides, hydroxides, and the carbonates of zinc, aluminum, tin, tungsten, and zirconium have low cost, low toxicity, and low color in the dried coating. Zinc oxide can be used. The transition metal oxide, hydroxide, or carbonate can be added as a slurry in water, optionally with an added dispersant such as low molecular weight polymer or copolymer of (meth)acrylic acid. The transition metal oxide, hydroxide, or carbonate can be added during the polymerization process or after the polymerization has been completed. Alternatively, the transition metal can be added in a soluble form such as a solution of zinc ammonium carbonate added after the formation of the (meth)acrylic polymer dispersion and adjusting the pH to a value greater than 8.

The aqueous leather coating composition can contain a dispersion of water-filled voided particles, which can provide opacity to the dried coating film. Water-filled voided particles are polymer particles that contain a polymer shell including at least one internal void space within the particle. Optionally, the internal void can be connected to the exterior of the particle by at least one channel. As used herein, the term "water-filled" indicates that the internal void contains water and optionally other liquid or water soluble components of the aqueous medium. The water-filled voided particles have a density similar to the density of the aqueous medium. In contrast to gas filled voided particles, the water-filled voided particles have little or no tendency to float to the top of the aqueous leather treatment composition. The average particle diameter of the water-filled voided particles can be 0.1 to 4 micron, specifically 0.3 to 2 micron, and more specifically 0.4 to 1.2 micron. The water-filled void volume can be 10 to 70 volume % and specifically 20 to 60 volume % of the total volume of the water-filled voided particles. The polymer shell can be one or more layers of any (meth)acrylic polymer or combination of (meth)acrylic polymers, including polymers containing copolymerized styrene and (meth)acrylate monomers. The water-filled voided polymer particles can be produced by multi-stage sequential emulsion polymerization techniques. The water-filled voided particles can have a glass transition temperature of at least 60° C., and specifically 60° C. to 120° C. The water-filled voided particles can have an outer polymer shell with a glass transition value in the range of −50 to −10° C. Suitable water-filled voided particles are disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; U.S. Pat. No. 5,510,422, and U.S. Pat. No. 6,139,961, which are herein incorporated by reference in their entirety.

The aqueous leather coating composition can comprise an aqueous dispersion of hard polymer particles. The hard polymer particles have a glass transition temperature of 40 to 150° C., and specifically of 40° C. to 150° C. The average particle diameter of the hard polymer particles is typically 10 to 500 nm. Suitable amounts of the hard polymer particles in the aqueous leather treatment composition are 5 to 30 weight %, specifically 10 to 25 weight %, based on the total dry weight of the aqueous polymer dispersion and the hard polymer particles.

The coating composition can comprise a dulling agent. The dulling agent can comprise one or both of an inorganic dulling agent such as silica, specifically silica dioxide, and an organic dulling agent such as a polymeric dulling agent. The polymeric dulling agent can comprise (meth)acrylic polymer, a polyurethane, a polysiloxane, or a combination comprising one or more of the foregoing dulling agents. The dulling agent can be present in an amount of 1 to 30 weight %, specifically 5 to 20 weight %, based on the total dry amount of the emulsifiable polyisocyanate, the aqueous polymer dispersion, and the dulling agent.

The aqueous leather coating composition can comprise auxiliaries such as one or more of flow additives; chain transfer agents; chain extenders; leveling agents; frothing agents such as one or more of air, carbon dioxide, nitrogen, argon, and helium; dispersants; thickeners; flame retardants; pigments; antistatic agents; reinforcing fibers; preservatives; biocides; acid scavengers; coalescing agents; buffers; neutralizers; thickeners; humectants; wetting agents; biocides; plasticizers; antifoaming agents; colorants; clays; solvents such as isopropanol or methoxypropanol; anti-tack auxiliaries such as starch, casein, and waxes; enzymes; rheology modifiers; biocides; mildewcides; wetting agents; coalescents; fluorocarbons; silicone oils; proteins; and antioxidants. The additive can comprise one or more of calcium carbonate, silicon dioxide, and carbon particles. In some embodiments, the aqueous leather coating composition comprises an auxiliary selected from a dulling agent, a pigment, a flow control agent, a thickener, an anti-tack agent, and a combination thereof.

Advantageously, the aqueous leather coating composition has good stability despite the expected reactivity of isocyanate with water. The stability is demonstrated by resistance to increases in viscosity, resistance to separation and settling of the solid components from the aqueous phase, and resistance to gelation. In some embodiments, the aqueous leather coating composition can have a Ford 4 viscosity of less than or equal to 50 seconds, specifically less than or equal to 40 seconds, more specifically less than or equal to 30 seconds at 23° C., after aging for two weeks at 23° C. In addition to resistance to increases in viscosity, the aqueous leather coating composition exhibited resistance to gelation. Resistance to gelation was measured by passing the freshly prepared coating composition through a 100-mesh, more specifically a 150-mesh filter. For topcoats, resistance to gelation is measured by passing the freshly prepared coating composition through a 200-mesh filter, and subsequently passing the same coating composition through the 200-mesh filter again after aging for two weeks at 23° C. Resistance to gelation was indicated by the absence of significant gel, grit, or skin on the filters when the aqueous leather coating composition was filtered as described above.

A method of coating leather comprises applying an aqueous leather coating composition comprising 1 to 40 weight percent of an emulsifiable polyisocyanate comprising the reaction product of an isocyanurate of the formula (1) and an emulsifier, wherein the average isocyanate functionality of the emulsifiable polyisocyanate is 2 to 4.5; and 60 to 99 weight percent of an aqueous polymer dispersion having a $T_g$ of 70 to 40° C. and selected from a (meth)acrylic polymer dispersion, a polyurethane dispersion, a (meth)acrylic polymer/polyurethane hybrid dispersion and a combination comprising one or more of the foregoing aqueous polymer dispersions; wherein all weight percents are on a dry basis, and based on the total dry amount of the emulsifiable polyisocyanate and the aqueous polymer dispersion; to leather; and drying the applied aqueous leather coating composition to form a coating. The coating can be a basecoat, a topcoat, or both consecutively. The aqueous leather coating composition can be produced shortly before use by mixing the emulsifiable polyisocyanate, the aqueous polymer dispersion, and any other additives or auxiliaries, with water shortly before use. All of the above-described variations in the aqueous leather composition apply as well to the method of preparing the composition.

The aqueous leather coating composition can be applied to leather by any means known in the art. Suitable methods to apply the aqueous leather coating composition include conventional coatings application methods such as curtain coating, brush coating, roll coating, and spraying methods such as air-atomized spray, air-assisted spray, airless spray, high volume low pressure spray, and air-assisted airless spray. Typical application rates of the aqueous leather treatment composition are in the range of 2.0 to 100 grams dry weight per square meter ($g/m^2$). The coating composition applied to a substrate is generally dried, or allowed to dry at a temperature range of 20 to 100° C. to provide a coated leather substrate having a dried coating of the aqueous leather coating composition on at least one surface of the leather substrate. The aqueous leather coating composition can be dried and cured after deposition onto the substrate at 0 to 100° C., specifically 20 to 90° C., and for 30 seconds to 10 days, depending on the drying temperature. The drying and curing method can vary depending on, for example, the specific components of the coating composition, the coating amount, and the type of leather. Examples of the drying and curing method include air drying at room temperature, hot air drying at for example 85° C., and infrared heating.

The aqueous leather coating composition can be applied directly onto a leather substrate or indirectly coated over a primer layer. The primer can be a conventional primer comprising a (meth)acrylic polymer, a polyurethane, a polyacrylonitrile, a polybutadiene, a polystyrene, a polyvinyl chloride, a polyvinylidene chloride, a polyvinyl acetate, or a combination thereof. The application of a primer layer can improve the smoothness and/or uniformity of appearance. The primer layer can be applied in a dried amount of 1 to 100 $g/m^2$.

The aqueous leather coating composition can be applied to leather or a leather-like substrate such as, for example, natural leather, artificial leather, synthetic leather, and vinyl leather. Examples of leather-like substrates include polyurethanes, polyvinyl chlorides, polyolefins, and polyamides. Likewise, the coating composition can be applied to natural skin that originated from, for example a cow, a sheep, a goat, a pig, a horse, a kangaroo, a deer, an alligator, or a snake. The coating composition can be applied to leather such as mineral-tanned or vegetable-tanned leather including full-grain leather, buffed or corrected-grain leather, and split leather, with or without a prior treatment with an impregnating resin mixture and with or without the application of subsequent coatings. The leather can receive a smooth or hair cell embossing prior to coating with the aqueous leather treatment composition to provide a flat surface for coating or to reduce the porosity of buffed or split leather.

The aqueous leather coating composition can be applied to leather by any means known in the art to form a coated leather article. A coated leather article can be formed by applying the aqueous leather coating composition to leather; and drying the aqueous leather coating composition to form a coating. All of the above-described variations in the aqueous leather coating composition apply as well to the coated leather article comprising the coating.

The coated leather article can be embossed by an embossing process such as a hydraulic plate embossing process or a roller embossing process. In an embossing process, the coated surface of the coated leather article is contacted with an engraved surface to transfer the pattern of the engraved plate to the coated leather article. In the hydraulic plate embossing process, the engraved surface is a steel plate having an engraved pattern, which is contacted with the coated surface of the coated leather article under conditions of temperature and pressure. Typical embossing conditions using hydraulic plate embossing are contact times in the range of 0.5 to 7 seconds; temperatures in the range of 80 to 130° C.; and pressures less than or equal to 25 MPa (approximately 250 bar). In roller embossing processes, the engraved surface is a steel roll having an engraved pattern on the surface of the roll, which is contacted with the coated surface of the coated leather article under conditions of temperature and pressure. Typical embossing conditions using roller embossing are temperatures in the range of 80 to 130° C., pressures less than or equal to 80 MPa (approximately 800 bar), and roll speeds of 3 to 10 meters per minute. After an embossing step, the embossed coated leather article can be either milled or staked to restore some of the original thickness or softness of the coated leather article.

The coated leather articles coated can be further processed into various products. Examples include interiors of building constructions; interiors of vehicles such as a seat, headrest, armrest, steering component, door interior, and ceiling interior; furniture items such as a sofa, a living room chair, a dining room chair, and a table; shoes such as boots, pumps, business shoes, sports shoes, and hard shoes; bags such as a school child's satchel, a hand bag, a shoulder bag, a pouch, a Boston bag, and a backpack; clothes such as a skirt, a coat, pants, a jacket, a rider suit, ski wear, a glove, a hat; accessories such as a purse, a belt, a watch band, a pocket diary, a harness, and a book cover; a raw material for handicrafts. The product can be prepared by cutting and sewing or by shaping the product and then applying the coating or by coating the product and then by shaping or by cutting and sewing.

The terms "a" and "an" do not denote a limitation of quantity, but rather the presence of at least one of the referenced item. The term "or" means "and/or." The open-ended transitional phrase "comprising" encompasses the intermediate transitional phrase "consisting essentially of" and the close-ended phrase "consisting of." Claims reciting one of these three transitional phrases, or with an alternate transitional phrase such as "containing" or "including" can be written with any other transitional phrase unless clearly precluded by the context or art. Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and are independently combinable.

"Combination" is inclusive of blends, mixtures, alloys, reaction products, and the like. The terms "first," "second," and the like, herein do not denote any order, quantity, or importance, but rather are used to denote one element from another. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", "some embodiments" and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

As used herein, the term "aqueous polymer dispersion" refers to a dispersion of a polymer in water. When properties of the aqueous polymer dispersion are provided, for example $T_g$, hydroxyl number, or the presence of absence of hydroxyl groups, the properties apply to the dry polymer.

As used herein, the term "(meth)acrylic" refers to both acrylic and methacrylic, the term (meth)acrylate refers to both acrylate and methacrylate, and the term "(meth)acrylamide" refers to both acrylamide and (meth)acrylamide.

"Glass transition temperature" or "$T_g$" as used herein, refers to the temperature at or above which a glassy polymer will undergo segmental motion of the polymer chain. Glass transition temperatures of a polymer can be estimated by the Fox equation [Bulletin of the American Physical Society 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in Kelvin. For polymers containing three or more monomers, additional terms are added ($w_n/T_{g(n)}$). The $T_g$ of a polymer phase can also be calculated by using the appropriate values for the glass transition temperatures of homopolymers, which can be found, for example, in "Polymer Handbook", edited by J. Brandrup and E. H. Immergut, Interscience Publishers. The values of $T_g$ reported herein for (meth)acrylic polymers are calculated using the Fox equation. The values of $T_g$ reported herein for the polyurethanes are measured using differential scanning calorimetry.

EXAMPLES

Ford 4 viscosity was measured with a Ford #4 cup in accordance with ASTM D4212-10, Standard Test method for Viscosity by Dip-Type Viscosity Cup.

Dry add-on was measured by first taring a 1 foot squared ($ft^2$), Duralar Add-on card on a balance with resolution of 0.01 grams, spray-applying a finish on the leather and Duralar card simultaneously, drying the leather and card at 185° F. for 2 minutes, and weighing the dried card to determine the weight of the dry add-on per $ft^2$.

Tensile properties were measured in accordance with ASTM D2370-98 (2010), "Standard Test Method for Tensile Properties of Organic Films".

Gloss was measured using a gloss meter (BYK Gardner USA MICRO-TRI-GLOSS meter, catalogue number 4520). Gloss was measured on both coated leather and coated card. (Leneta Form 1B). When leather was used the dry add-on in $g/ft^2$ is reported. When the card was used the coating film was prepared by applying a 3 mil wet film with a bird bar and drying the wet film at 185° C. for 5 minutes.

Color properties were determined by measuring L and Delta E. L and Delta E were measured using a spectrophotometer (Xrite USA model XRITE 8400, XRITE COLOR MASTER CM-2). Reflectance data were obtained with the spectral component included and under D65/10° observer conditions.

Bally flexibility was measured in accordance with ASTM D6182-00 (2010), "Standard Test Method for Flexibility and Adhesion of Finished Leather" by repeatedly flexing a test specimen over the cited number of cycles and temperature. Specifically, a 4 cm×6.7 cm swatch of the finished crust was attached to a Bally flexometer (Otto Specht, Stuttgart, Germany Model 2397) and subjected to 100,000 flexing cycles at ambient temperature. After flexing, the leather was evaluated using a stereoscope (at 45× magnification) to assess damage to the finish (cracking or white crazing).

Rubbing resistance was determined with using a Gakushin test unit made by Schap. The test method is a follows: an abrasive cloth, #6 duct cloth, is fixed to a platen and a strip of leather is fixed to a head, the two are contacted together and a total head weight above the leather of 1 kilogram (kg) is set in place, the test is activated and the platen moves back and forth at a rate of 30 cycles per minute enabling the duct cloth to rub across the surface of the leather swatch with the pressure of 1 kg applied, the test is complete when the leather coating is abraded to the extent that the russet becomes visible or 20,000 cycles, whichever occurs first.

Rub fastness, including dry and wet, was determined in accordance with ASTM D 5053-03 (2009) Standard Test Method for Color fastness of Crocking Leather. Regarding the wet rub fastness, wet rub fastness was conducted using a rub fastness tester (Satra Footware Technology Center model STM421). A 11.5 cm×3.5 cm swatch was removed from the finished crust. To determine the finish fastness of the top-coated leather, a 1.5 cm×1.5 cm felt rubbing pad was saturated with water and placed on the equipment rubbing head (total weight of rubbing head was 1 kg). To complete the testing, the leather swatch was inserted into the rub fastness tester and stretched an additional 10%, the water saturated felt pad was applied to the finished surface and 300 rubbing cycles were completed. The finish was visually evaluated for damage and the felt pad used for the test was visually evaluated for pigment transfer by comparing it to a control felt pad (un-used felt pad). The color difference between the felt pads was assessed using a grayscale chart. Regarding the dry rub fastness, dry rub fastness was conducted using a rub fastness tester (Satra Footware Technology Center model STM421). A 11.5 cm×3.5 cm swatch was removed from the finished crust. To determine the dry rub fastness of the top-coated leather, a 1.5 cm×1.5 cm dry felt rubbing pad was placed on the equipment rubbing head (total weight of rubbing head was 1 kg). To complete the testing, the leather swatch was inserted into the rub fastness tester and stretched an additional 10%, the pad was applied to the finished surface and 500 rubbing cycles were completed. The finish was evaluated for increase in surface gloss and the felt pad was evaluated using a grayscale for pigment transfer.

Rub fastness of alkaline sweat was determined in accordance with DIN EN ISO 105-E04.

Tack was determine qualitatively by determining how sticky a coating feels to the touch and also, in the case of leather, when the leather coating is folded face to face and pressed together between the fingers. Tack was assessed by judging the amount of cling between the two surfaces when trying to separate them.

The components as used in the coating compositions of Tables 5 and 8 are described in Table 1.

TABLE 1

| Component | Description |
| --- | --- |
| XL DI | AQUADERM ® XL DI, an 80% solids water-emulsifiable HDI-based crosslinker available from Lanxess. |

TABLE 1-continued

| Component | Description |
| --- | --- |
| AD-1 | HYDRHOLAC ™ AD-1, a 23% solids aqueous dispersion containing an inorganic dulling agent and an acrylic polymer having a $T_g$ of −43° C., available from Dow. |
| U-91 | PRIMAL ™ Binder U-91, a 40% solids aliphatic polyurethane dispersion having a $T_g$ of −55° C., available from Dow; Dry film properties: Tensile strength at break of 5500 psi (37.9 MPa), elongation at break of 840%, 100% modulus of 870 psi (6.0 MPa), and toughness of 20,200 in-lb/in$^3$, measured in accordance with ASTM D2370-98(2010). |
| SB-300 | PRIMAL ™ SB-300 Emulsion, a self-crosslinking acrylic polymer dispersion having a $T_g$ of −40° C., available from Dow. |
| Fluid H | AQUADERM ® Fluid H, a polysiloxane/polyether copolymer flow control agent, available from Lanxess. |
| Black BN | EUDERM ® BN, a pigment dispersion containing 26% carbon and an acrylic binder, available from Lanxess. |
| 2229 | ROSILK ™ 2229, a 60% solids silicone dispersion, available from Dow. |
| RM-1020 | ACRYSOL ™ RM-1020, a 20% solids nonionic polyurethane associative thickener, available from Dow. |
| Nappa Soft S | EUDERM ® Nappa Soft S, a 23% solids soft anti-tack agent and filler, available from Lanxess. |
| Dull HE-6 | PRIMAL ™ Dull HE-6, a non-film forming silica based dulling agent available from Dow. |

Example 1

ADI Trimer Composition

The composition of the ADI trimer used in Examples 2-5 is shown in Table 2, where equivalent weight (EW) is weight average molecular weight (MW)/functionality and the values as shown do not reflect the 30% butyl acetate added.

TABLE 2

| ADI Isocyanurates | % Composition | Functionality | MW (g/mol) | EW (g/mol) | % NCO |
| --- | --- | --- | --- | --- | --- |
| 1 | 48.6 | 3 | 583 | 194 | 21.6 |
| 2 | 22.9 | 4 | 971 | 243 | 17.3 |
| 3 | 12.5 | 5 | 1360 | 272 | 15.5 |
| 4 | 6.0 | 6 | 1748 | 291 | 14.4 |
| 5+ | 9.1 | 7 | ≥2134 | ≥305 | ≤13.8 |
| Average | 99.1 | 3.78 | 885 | 234 | 17.9 |

Example 2

Synthesis of Emulsifiable ADI Trimer 1

50 g of ADI trimer (70% solution in butyl acetate) and 6.2 g of MPEG (MW of 553 g/mol) were added to a dried glass jar. The solution was heated to 80° C. under thorough mixing for 6 hours. ATR-FTIR was used to monitor the NCO peak at 2250 cm$^{-1}$ to confirm that the reaction had gone to completion. The product comprised 15% MPEG. Results are shown in Table 3.

Example 3

Synthesis of Emulsifiable ADI Trimer 2

50 g of ADI trimer (70% solution in butyl acetate) and 6.2 g of MPEG (MW of 782 g/mol) were added to a dried glass jar. The solution was heated to 80° C. under thorough mixing for 6 hours. ATR-FTIR was used to monitor the NCO peak at 2250 cm$^{-1}$ to confirm that the reaction had gone to completion. The product comprised 15% MPEG. Results are shown in Table 3.

Example 4

Synthesis of Emulsifiable ADI Trimer 3

50 g of ADI trimer (70% solution in butyl acetate) and 11.4 g of MPEG (MW of 782 g/mol) were added to a dried glass jar. The solution was heated to 80° C. under thorough mixing for 6 hours. ATR-FTIR was used to monitor the NCO peak at 2250 cm$^{-1}$ to confirm that the reaction had gone to completion. The product comprised 25% MPEG. Results are shown in Table 3.

TABLE 3

| Emulsifiable ADI Trimer | 1 | 2 | 3 |
|---|---|---|---|
| MW of MPEG (g/mol) | 553 | 782 | 782 |
| Target % MPEG | 15 | 15 | 25 |
| Target % NCO without solvent | 14.1 | 14.5 | 12.1 |
| Target % NCO with solvent | 10.4 | 10.6 | 9.2 |
| Functionality | 3.5 | 3.6 | 3.4 |
| Percent Solids | 73.3 | 73.3 | 75.7 | sec. Polyisocyanate (17.6 g) was then added to the 202.4 g of the premix, resulting in 220.0 g of coating composition.

TABLE 4

| Component | Amount (Parts per hundred by wt.) | Amount (g) |
|---|---|---|
| Water | 20 | 200 |
| Fluid H | 1 | 10 |
| Black BN | 3 | 30 |
| U-91 | 20 | 200 |
| AD-1 | 40 | 400 |
| 2229 | 7 | 70 |
| RM-1020 | 1 | 10 |
| Premix total | 92 | 202.4 |
| Polyisocyanate | 8 | 17.6 |
| Total | 100 | 222.0 |

The properties of the coating compositions using emulsifiable ADI trimers 1-3 and XL DI polyisocyanate are shown in Table 5. For determining Delta E, the coating of Comparative Example 8 was used as the reference coating.

TABLE 5

| | Ex. 5 | Ex. 6 | Ex. 7 | C. Ex. 8 |
|---|---|---|---|---|
| Polyisocyanate | ADI Trimer 1 | ADI Trimer 2 | ADI Trimer 3 | XL DI |
| Property | | | | |
| Ford 4 Viscosity After 45 minutes (sec) | 32.0 | 30.5 | 32.0 | 23.5 |
| Ford 4 Viscosity After 2 weeks (sec) | 39.0 | 38.9 | 30.0 | Solid |
| Dry add-on, To leather (g/ft$^2$) | 1.6 | 1.8 | 1.9 | 1.6 |
| 60° Gloss | 1.9 | 1.7 | 2.4 | 2.1 |
| 85° Gloss | 2.0 | 2.1 | 3.2 | 2.8 |
| Color - L Value | 23.03 | 23.03 | 23.56 | 23.27 |
| Color Difference - Delta E | 0.05 | 0.25 | 0.29 | — |
| Tack | Slight | Slight | Moderate | Slight |
| Bally flexibility, 23° C., 100,000 cycles | Pass | Pass/ 1 microcrack | Pass | Pass |
| Cold Bally flexibility, −10° C., 30,000 cycles | Pass/1 very small topcoat crack | Pass/a few very small topcoat cracks | Pass/1 very small topcoat crack | Pass |
| Gakushin Rubbing (Average of 3) | 2176 | 2961 | 2846 | 2086 |

Table 3 shows that the resulting functionality of the emulsifiable ADI trimer is 3.4 to 3.6 and the resulting percent solids is 73.3 to 75.7%.

Examples 5-7 and Comparative Example 8

Preparation of Pigmented Basecoat Compositions

Coating compositions were prepared with Emulsifiable ADI Trimers 1-3 and compared to a coating composition prepared with AQUADERM® XL DI polyisocyanate, a commercial HDI-based emulsifiable polyisocyanate, herein referred to as "XL DI". The compositions are described in Table 4. The compositions were prepared by mixing water together with the other components in the amounts shown in Table 4 to form a premix, which had a Ford 4 viscosity of 21

The results in Table 5 show that the coating compositions comprising Emulsifiable ADI Trimers 1-3 (Examples 5-7) display little to no increase in viscosity after two weeks. These coating compositions were clean when passed through a fine mesh filter, which indicates little to no gel formation. In contrast, the coating composition comprising XL DI (Comparative Example 8) began to gel overnight, and solidified within two weeks. It is clear from these data that the compositions comprising Emulsifiable ADI Trimer have a much longer shelf-life as compared to the coating compositions comprising XL DI. Table 5 also shows that the wear resistance of the coatings of Examples 5-7 was higher than that of the coating of Comparative Example 8. In contrast to Comparative Example 8, Examples 5-7 were able to achieve an average Gakushin rubbing value of greater than at least 2100. In particular, Examples 6 and 7, having Gakushin rubbing values of 2961 and 2846, respectively, had much higher wear resistance than Comparative Example 8, having a Gakushin rubbing value of 2086. These results show that the use of the emulsifiable ADI trimer of the present invention in coating compositions imparts improved wear resistance to the resulting coatings compared to XL DI. The Bally flexibility performance was acceptable in all of the examples.

Examples 9-11 and Comparative Example 12

Preparation of Pigment-Free Topcoat

The coating compositions of Examples 9-11 and Comparative Example 12 were prepared using the same components of Examples 5-7 and Comparative Example 8 in Table 5, except that the pigment Black BN was not added. The properties of the coating compositions are shown in Table 6.

TABLE 6

|  | Ex. 9 | Ex. 10 | Ex. 11 | C. Ex. 12 |
|---|---|---|---|---|
| Polyisocyanate | ADI Trimer 1 | ADI Trimer 2 | ADI Trimer 3 | XL DI |
|  |  | Property |  |  |
| Dry add-on, To leather (g/ft²) | 1.5 | 1.5 | 1.9 | 1.5 |
| 60° Gloss | 2.0 | 1.4 | 1.7 | 1.7 |
| 85° Gloss | 2.9 | 1.7 | 1.7 | 1.7 |
| Color - L Value | 24.46 | 24.16 | 24.52 | 24.28 |
| Color - Delta E | 0.20 | 0.17 | 0.27 | Ref. |
| Tack |  | No difference, slight for all. |  |  |
| Bally flexibility, 23° C., 100,000 cycles | Pass with trace crazing | Pass with trace crazing | Pass with trace crazing | Pass |
| Cold Bally flexibility, −10° C., 30,000 cycles | Pass with trace crazing | Pass with moderate crazing | Pass with moderate crazing | Pass with trace crazing |
| Average Gakushin Rubbing | 3300 | 2867 | 4150 | 2230 |
| Early wet rub |  | No damage or color transfer. |  |  |
| Alkaline sweat rub |  | Pass - Acceptable damage or color transfer. |  |  |
| Gas rubs |  | No damage or color transfer, slight whitening in all cases. |  |  |

Table 6 shows that the wear resistance of the coatings of Examples 9-11 was higher than that of the coating of Comparative Example 12. In contrast to Comparative Example 12, Examples 9-11 were able to achieve an average Gakushin rubbing value of greater than at least 2800. In particular, Examples 9-11, exhibited average Gakushin rubbing values of 3300, 2867, and 4150, respectively, all much higher than Comparative Example 12, having a Gakushin rubbing value of 2230. These results show that the use of the emulsifiable ADI trimer of the present invention in coating compositions imparts improved wear resistance to the resulting coatings compared to XL DI.

Examples 13-15 and Comparative Example 16

Preparation of Pigmented Basecoat Compositions

A standard basecoat composition was prepared using the components listed in Table 7. The composition makes use of PRIMAL™ SB-300, a self-crosslinking film former, as the aqueous polymer dispersion. SB-300 is used in the basecoat because the crosslinking prevents cut-through when the leather is embossed at high temperature and pressure while providing good print retention. Use of SB-300 is generally limited to compositions which are free of polyisocyanate crosslinkers based on HDI, such as XL DI, because it catalyzes the reaction of isocyanate groups and leads to rapid gelation, within a few hours.

TABLE 7

| Component | Amount (Parts per hundred by wt.) | Amount (g) |
|---|---|---|
|  | 12 | 240 |
| Nappa Soft S | 10 | 200 |
| Dull HE-6 | 13 | 260 |
| SB-300 | 45 | 900 |
| Black BN | 15 | 300 |
| 2229 | 2 | 40 |
| Total | 97 | 1940 |

ACRYSOL RM-1020 was post-added to the composition of Table 7 to increase the Ford 4 viscosity to about 34 seconds. The resulting mix was filtered through course cheesecloth and divided into four equivalent 450-g aliquots. The aliquots were mixed with Emulsifiable ADI Trimers 1-3 (Examples 13-15) and with XL DI (Comparative Example 16). The results are shown in Table 8.

TABLE 8

|  | Ex. 13 | Ex. 14 | Ex. 15 | C. Ex. 16 |
|---|---|---|---|---|
| Polyisocyanate type | ADI Trimer 1 | ADI Trimer 2 | ADI Trimer 3 | XL DI |
| Polyisocyanate amount (g) | 13.5 | 13.5 | 13.5 | 13.5 |
| Premix from Table 8 (g) | 450 | 450 | 450 | 450 |
| Total (g) | 463.5 | 463.5 | 463.5 | 463.5 |
|  |  | Property |  |  |
| Ford 4 Viscosity, Initial (sec) | 33 | 34 | 27 | 32 |
| Ford 4 Viscosity, 1 hr (sec) | 41 | 35 | 23 | 51 |
| Ford 4 Viscosity, Overnight (sec) | 40 | 31 | 25 | Gelled |
| Gloss 60/85, card initial | 3.2/9.5 | 3.3/9.6 | 3.4/10.1 | 3.8/8.8 |
| Gloss 60/85, card after overnight storage of the wet liquid | 3.9/11.4 | 3.7/11.1 | 4.0/11.9 | Gelled |

As can be seen from Table 8, the basecoat composition of Comparative Example 16, comprising XL DI, was unstable. The composition built viscosity rapidly, and gelled overnight. In contrast, the basecoat compositions of Examples 13-15, comprising Emulsifiable ADI Trimers 1, 2, and 3, were significantly more stable. Only minimal changes in viscosity were observed, even after 24 hours. Thus, the basecoat compositions comprising the emulsifiable ADI trimers provided significant improvements in stability and pot-life over the basecoat composition comprising XL DI.

Example 17

Coating of Leather with Basecoat Compositions of Examples 13-15 and Comparative Example 16

The basecoat compositions of Examples 13-15 and Comparative Example 16 were spray applied to a heavily buffed russet leather at a wet add-on level of 14.5-15.0 g/ft$^2$, dried for 10 minutes at 185° F., rested at ambient temperature (23° C.), and embossed at 50 tons, a 3-second dwell, and using a Devon plate. Embossing was done after 1-hour resting and after overnight resting. All of the embossed coatings exhibited similar print retention, cut-through, definition, plate cling, and tack. There was no adverse effect of the slower reactivity of the Emulsifiable ADI Trimers in the basecoat compositions.

While the disclosure has been described with reference to an exemplary embodiment, it will be understood by those skilled in the art that various changes can be made and equivalents can be substituted for elements thereof without departing from the scope of the disclosure. In addition, many modifications can be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An aqueous leather coating composition comprising:
1 to 40 weight percent of an emulsifiable polyisocyanate comprising the reaction product of
an isocyanurate of the formula

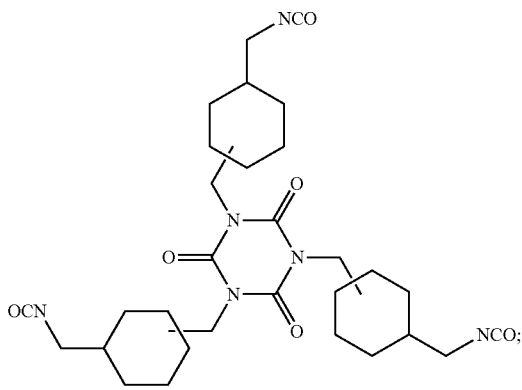

and
an emulsifier,
wherein the average isocyanate functionality of the emulsifiable polyisocyanate is 2 to 4.5; and
60 to 99 weight percent of an aqueous polymer dispersion having a T$_g$ of −70 to 40° C. and selected from a (meth) acrylic polymer dispersion, a polyurethane dispersion, a (meth)acrylic polymer/polyurethane hybrid dispersion and a combination comprising one or more of the foregoing aqueous polymer dispersions;
wherein all weight percents are on a dry basis, and based on the total dry amount of the emulsifiable polyisocyanate and the aqueous polymer dispersion.

2. The aqueous leather coating composition of claim 1, wherein the isocyanurate is derived from one or more of cis-1,3-bis(isocyanatomethyl)cyclohexane, trans-1,3-bis(isocyanatomethyl)cyclohexane, cis-1,4-bis(isocyanatomethyl)cyclohexane, and trans-1,4-bis(isocyanatomethyl)cyclohexane.

3. The aqueous leather coating composition of claim 1, wherein the emulsifier has at least one hydrophilic group and at least one group reactive with isocyanate, selected from hydroxyl, mercapto, and primary or secondary amine.

4. The aqueous leather coating composition of claim 3, wherein the hydrophilic group is a carboxyl group or sulfo group.

5. The aqueous leather coating composition of claim 3, wherein the emulsifier is a polyethylene oxide or a copolymer of ethylene oxide with propylene oxide, butylene oxide, styrene oxide, or a combination thereof.

6. The aqueous leather coating composition of claim 1, wherein the emulsifier is an alkoxy polyethylene oxide of the formula

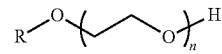

wherein R is a C$_{1-4}$ alkyl group and n is 1 to 100.

7. The aqueous leather coating composition of claim 1, wherein the aqueous polymer dispersion is free of hydroxyl groups.

8. The aqueous leather coating composition of claim 1, wherein the aqueous polymer dispersion comprises a multi-stage (meth)acrylic polymer dispersion.

9. The aqueous leather coating composition of claim 1, comprising:
1 to 40 weight percent of the emulsifiable polyisocyanate;
10 to 90 weight percent of the (meth)acrylic polymer dispersion; and
10 to 90 weight percent of the polyurethane dispersion;
wherein the emulsifiable polyisocyanate, the (meth)acrylic polymer dispersion, and the polyurethane dispersion are present in a combined amount of 100 weight percent.

10. The aqueous leather coating composition of claim 1, further comprising a auxiliary selected from a dulling agent, a pigment, a flow control agent, a thickener, an anti-tack agent, and a combination thereof.

11. The aqueous leather coating composition of claim 1, comprising 10 to 40 weight percent of the emulsifiable polyisocyanate and 60 to 90 percent of the aqueous polymer dispersion.

12. The aqueous leather coating composition of claim 1, further comprising 1 to 30 weight percent of a dulling agent comprising silica, a (meth)acrylic polymer, a polyurethane, a polysiloxane, or a combination thereof, based on the total dry weight of the emulsifiable polyisocyanate, the aqueous polymer dispersion, and the dulling agent.

13. The aqueous leather coating composition of claim 1, wherein the aqueous polymer dispersion comprises a (meth)acrylic polymer dispersion having a weight average molecular weight of 10,000 to 5,000,000 g/mol, wherein the (meth) acrylic polymer dispersion in the form of a dried film exhibits a tensile strength at break of 0.5 to 10 MPa, a 100% modulus of 0.1 to 1 MPa, and an elongation at break of 500 to 1,800%, as measured according to ASTM D2370-98 (2010).

14. The aqueous leather coating composition of claim 1, wherein the aqueous polymer dispersion comprises a polyurethane dispersion having a weight average molecular weight of 10,000 to 2,000,000 g/mol, as measured by gel permeation chromatography, wherein the polyurethane dispersion in the form of a dried film exhibits a tensile strength at break of 1 to 40 MPa, a 100% modulus of 1 to 10 MPa, and an elongation at break of 200 to 1,200%, as measured according to ASTM D2370-98 (2010).

15. An aqueous leather coating composition comprising:
    1 to 40 weight percent of an emulsifiable polyisocyanate comprising the reaction product of
        an isocyanurate of the formula

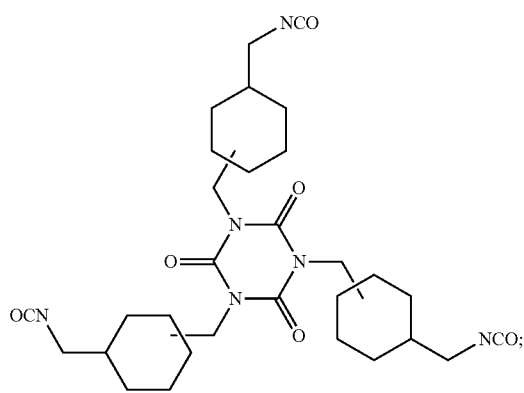

and
    an emulsifier,
    wherein the average isocyanate functionality of the emulsifiable polyisocyanate is 2 to 4.5; and
60 to 99 weight percent of an aqueous polymer dispersion having a $T_g$ of −70 to 40° C. and selected from a (meth)acrylic polymer dispersion, a polyurethane dispersion, a (meth)acrylic polymer/polyurethane hybrid dispersion and a combination comprising one or more of the foregoing aqueous polymer dispersions;
    wherein all weight percents are on a dry basis, and based on the total dry amount of the emulsifiable polyisocyanate and the aqueous polymer dispersion; and
    wherein the aqueous polymer dispersion is free of hydroxyl groups.

16. The aqueous leather coating composition of claim 15, comprising 10 to 40 weight percent of the emulsifiable polyisocyanate and 60 to 90 weight percent of the aqueous polymer dispersion.

17. The aqueous leather coating composition of claim 15, further comprising 1 to 30 weight percent of a dulling agent comprising silica, a (meth)acrylic polymer, a polyurethane, a polysiloxane, or a combination thereof, based on the total dry weight of the emulsifiable polyisocyanate, the aqueous polymer dispersion, and the dulling agent.

18. A method of coating leather, comprising:
    applying the aqueous leather coating composition of claim 1 to leather; and
    drying the aqueous leather coating composition to form a coating.

19. The method of claim 18 wherein the coating is a basecoat, a topcoat, or both consecutively.

20. The method of claim 18, wherein the leather comprises natural leather, artificial leather, synthetic leather, or vinyl leather.

21. A coated leather article formed by the method of claim 20.

* * * * *